United States Patent [19]

Lumpkin

[11] Patent Number: 5,307,755
[45] Date of Patent: May 3, 1994

[54] WORK VESSEL AND TRAILER

[76] Inventor: Anthony P. Lumpkin, 105 Yorkshire Pl., Gadsden, Ala. 35901

[21] Appl. No.: 882,045

[22] Filed: May 13, 1992

[51] Int. Cl.⁵ .............................................. B63B 3/02
[52] U.S. Cl. ..................................... 114/364; 114/219
[58] Field of Search ............... 114/352, 353, 354, 355, 114/356, 343, 77 R, 77 A, 219, 364; 441/35; 280/414.1, 414.3

[56] References Cited

U.S. PATENT DOCUMENTS

| | | | |
|---|---|---|---|
| 154,545 | 9/1874 | Emerson | 114/77 R |
| D. 238,565 | 1/1976 | Palmer | D12/6 |
| 1,259,860 | 3/1918 | Haussler | 114/77 R |
| 2,431,039 | 11/1947 | Harrison | 114/77 R |
| 2,453,155 | 11/1948 | Nelson et al. | 441/35 |
| 2,744,267 | 5/1956 | Roby | 114/77 R |
| 2,847,961 | 8/1958 | Meckenstock | 114/77 R |
| 2,856,704 | 10/1958 | Herbert | 37/75 |
| 3,036,539 | 5/1962 | Storey | 114/77 R |
| 3,179,961 | 4/1965 | Ward et al. | 114/356 |
| 3,371,362 | 3/1968 | Butler | 403/403 |
| 3,702,485 | 11/1972 | Thompson | 114/355 |
| 3,878,806 | 4/1975 | Garcia | 114/77 R |
| 3,943,586 | 3/1976 | Palmer | 114/63 |
| 4,469,346 | 9/1984 | Low | 280/414.1 |
| 4,560,316 | 12/1985 | Daniels | 280/414.1 |
| 4,676,181 | 6/1987 | Oates, Sr. | 114/364 |
| 4,768,454 | 9/1988 | Selken | 114/61 |
| 5,092,263 | 3/1992 | Hutchison et al. | 114/364 |

Primary Examiner—David M. Mitchell
Assistant Examiner—Stephen P. Avila
Attorney, Agent, or Firm—Robert C. Curfiss

[57] ABSTRACT

A vessel includes an interlocking gunwale system permitting a plurality of like vessels to be disposed in interlocking combination with one another for providing an enlarged work platform. The vessels are configured to permit side-to-side, stern-to-side, bow-to-side, bow-to-bow, bow-to-stern and stern-to-stern engagement. The interlocking gunwales are held in secure interlocking engagement by a tether line and a cleat and post arrangement provided on each vessel. A trailer for stowing and transporting a plurality of the vessels is also disclosed.

34 Claims, 5 Drawing Sheets

WORK VESSEL AND TRAILER

BACKGROUND OF THE INVENTION

1. Field of the Invention

This invention is generally related to vessels for surface work and rescue operations and is specifically directed to a vessel wherein a plurality of like vessels may be secured to one another for forming an enlarged work platform.

2. Description of the Prior Art

When undertaking surface work and rescue operations such as dragging a river bottom or the like, a plurality of boats or other vessels are generally secured in tandem, bow-to-stern, or side-to-side, whereby the assembly will span a river or the like, permitting a continuous dragging operation over an enlarged area. However, there are not any work vessels specifically designed for making enlarged working platforms by attaching a plurality of vessels to one another.

It is known, for example, to combine a plurality of barges to one another to develop a barge train which is moved over a large body of water by a single tow or push boat. An example of a barge and barge coupling is shown in U.S. Pat. No. 2,431,039 issued to Harrison on Nov. 18, 1947. It is also known to develop enlarged working platforms for use as dredge holes or drilling platforms, as is shown in U.S. Pat. No. 2,847,961 issued to Meckenstock on Aug. 19, 1958. A plurality of boats have been secured together by use of an elongated platform to provide an enlarged system for cleaning the bottom of a body of water, as shown in U.S. Pat. No. 2,856,704 issued to Herbert on Oct. 21, 1958.

However, there remains a need for a vessel which is portable and maneuverable and adapted to be attached in a plurality of configurations for surface rescue operations. One of the problems in developing such a vessel is the placement of the marine engine and the ability to attach the vessels in side-to-side, stern-to-side, bow-to-side, and bow-to-stern configurations to accommodate a plurality of different applications depending on the rescue operation undertaken and the size of the body of water in which the operation is taking place.

Examples of vessels with marine engines placed in a noninterfering relationship with the perimeter of the vessel are shown, by way of example, in U.S. Pat. Nos. 3,371,362 issued to Butler on Mar. 5, 1958; 3,702,485 issued to Thompson on Nov. 14, 1972; 3,943,586 issued to Palmer on Mar. 16, 1976; and Des. 238,565 issued to Palmer on Jan. 27, 1976.

There are also a number of vessels which have square or flat sided perimeters as shown, for example, in U.S. Pat. Nos. 2,744,267 issued to Roby on May 8, 1956 and 3,036,539 issued to Storey on May 29, 1962.

None of the vessel configurations of the prior art are readily adapted for quick use in rescue operations where time is a critical factor and it is desirable to quickly deploy the vessels in the water and secure them to one another in any of a plurality of configurations for facilitating quick rescue operations.

The subject invention is specifically directed to a work and rescue vessel wherein the vessel is specifically designed to be quickly and securely attached to a plurality of like vessels in any of a plurality of configurations, including side-to-side, side-to-stern, side-to-bow, bow-to-bow, stern-to-stern and bow-to-stern. This permits a flexible vessel readily adapted for use in any of a plurality of rescue operations. It is a specific feature of the subject invention that the gunwales of the vessel are designed to be positioned in interlocking relationship with one another, providing a secure attachment of the vessels to one another to provide a secure enlarged working platform for rescue operations. It is an additional feature of the invention that the marine motor utilized for powering the vessel is positioned inwardly of the perimeter of the vessel, in a noninterfering relationship with the gunwale, permitting both stern-to-stern and stern-to-bow attachment, as well as all other combinations.

In the preferred embodiment of the invention, the gunwale comprises a rail extending about the upper perimeter of the boat and having a channel adapted for receiving a locking member provided in the adjacent gunwale. The gunwales are positioned in interlocking abutting relationship with one another and secured in position by use of a tether line and a post and cleat system provided on each of the vessels.

In one embodiment, the gunwale includes a single rail and interlocking feature, whereas in a second embodiment, a dual interlock and over/under channel locking mechanism is utilized to provide a dual locking attachment.

It is an important feature of the invention that the vessel is substantially straight-sided, permitting the vessels to be attached to one another in any of a plurality of combinations. A marine motor is adapted to be installed on the vessel inwardly of the stern wall and in noninterfering relation with the gunwale, permitting the stern to be secured to any other vessel on the bow or stern or either side.

It is an additional feature of the invention that the vessel work platform include one or more adjustable and removable seats, permitting the platform to be versatile and adaptable to a variety of different uses and types of rescue operations.

Another aspect of the invention is the towing trailer for storing a plurality of the vessels. The vessels are generally used in combination, and the trailer is designed to hold a plurality of the vessels and a plurality of the engines, providing easy access for rapid deployment during rescue operations.

One embodiment of the trailer includes a triangular frame, where one vessel is stored on each side of the triangle with the marine motors stored on the inside of the triangle. The motors and the vessels may be quickly removed from the trailer for rapid deployment in a rescue operation.

Another embodiment of the trailer includes a plurality of racks where the vessels are stacked upon one another and may be quickly removed by pivoting the racks downwardly for sliding the vessels out of the racks. In this version, the motor may be stowed on the vessel deck during transportation.

The vessel of the subject invention provides a versatile work platform which is readily adapted for attaching a plurality of the vessels in combination to accommodate any of a variety of rescue operations.

It is, therefore, an object and feature of the subject invention to provide a vessel which is readily adapted to be used in combination with like vessels for providing an enlarged work platform for work and rescue operations.

It is an additional object and feature of the subject invention to provide a vessel wherein a plurality of like vessels may be secured to one another in a variety of combinations.

It is yet another object and feature of the invention to provide a vessel having a gunwale which may be securely attached in interlocking relationship with a like gunwale on a similar vessel.

It is a further object and feature of the subject invention to provide a vessel adapted for accommodating a marine motor which is in noninterfering relationship with any portion of the perimeter of the vessel.

It is yet another object and feature of the invention to provide a vessel with a work platform having seats which may readily be repositioned or removed from the vessel to provide the optimum versatility of the work platform area.

It is additional object and feature of the invention to provide a trailer for towing a plurality of like vessels whereby the vessels may be quickly moved from storage and deployed during rescue operations.

Other objects and features of the invention will be readily apparent from the accompanying drawings and detailed description of the preferred embodiments.

DETAILED DESCRIPTION OF THE PREFERRED EMBODIMENTS

A work and rescue vessel made in accordance with the subject invention as shown in FIGS. 1-4. As there shown, the vessel 10 includes a substantially flat bottom 12 and upstanding sidewalls 14 and 16. An inclined or sloped front or bow wall 18 is provided and a stern wall 20 comprises a pair of outer upstanding members 22 and 24 (see FIG. 3), an inner transom plate 26 and sidewalls 28 and 30 for defining a notch adapted for receiving a marine motor, as is particularly shown in FIG. 4. The bottom 12 may include a plurality of elongated ribs 32 for increasing structural strength. It should be noted that each of the walls 14, 16 and 18 and the stern wall stagments 22 and 24 have a straight, common upper edge 34, defining a boat or vessel of a substantially rectangular configuration.

The common upper edge 34 of each wall of the vessel is adapted for receiving a substantially continuous gunwale rail 36. It is an important feature of the invention that the gunwale rail 36 is adapted to be disposed in interlocking engagement with a like gunwale rail on a similar vessel, permitting the vessels to be disposed in interlocking engagement with one another to provide a plurality of working platform configurations, as shown, by way of example, in FIGS. 5 and 6.

Figure 1:
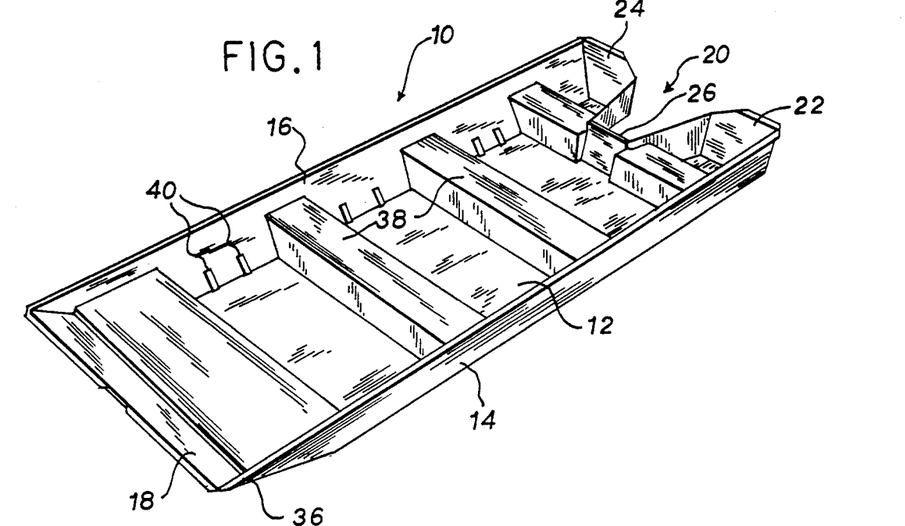
FIG. 1 is a perspective view of a vessel in accordance with the subject invention.
Figure 2:
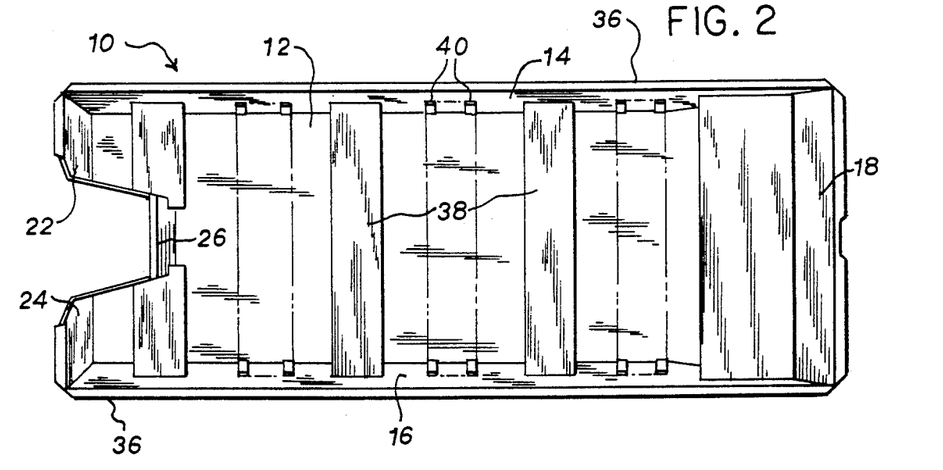
FIG. 2 is an overhead plan view of the vessel shown in FIG. 1.
Figure 3:
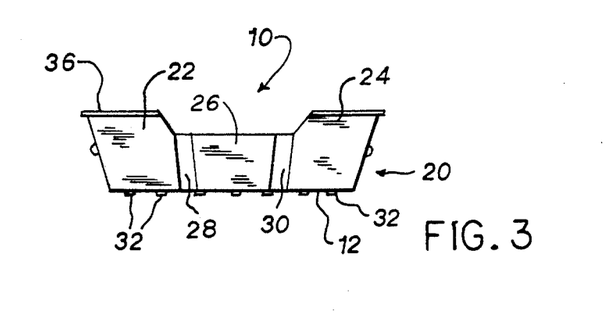
FIG. 3 is a stern plan view of the vessel shown in FIG. 1.
Figures 4, 5, 6:
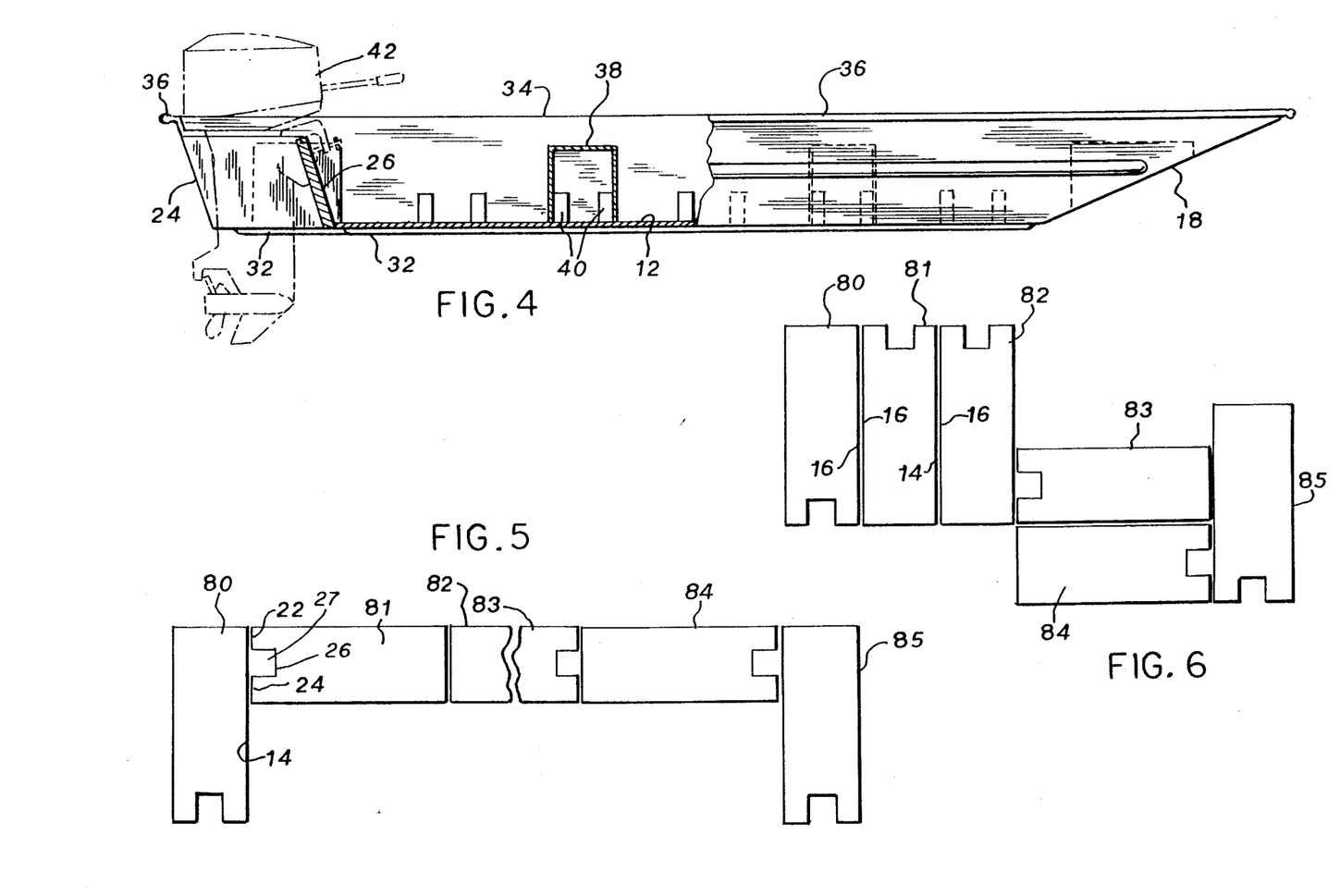
FIG. 4 is a side plan view, partially in section, of the vessel shown in FIG. 1.
FIG. 5 is a diagram illustrating a first example combination of vessels made in accordance with the subject invention.
FIG. 6 is a second diagrammatic view of a combination of vessels made in accordance with the subject invention.

In the preferred embodiment of the invention, the bottom 12 of the vessel defines a substantially flat deck or work platform and may include one or more seats 38. In the preferred embodiment, the seats 38 are of a substantially U-shaped cross section (see FIG. 4) and are adapted to rest on the deck. A plurality of outwardly projecting mounts 40 are secured to the sidewalls 14 and 16 of the vessel, and provide mounts for supporting and securing the seats 38 in position. As is shown in FIGS. 2 and 4, the seats may be placed in any of a plurality of positions, by placing the U-shaped underside of the seat 38 in alignment and abutting engagement with any pair of the mounting blocks 40. All of the mounting blocks 40 may be equally spaced along the sidewalls 14 and 16 (see FIG. 4) permitting maximum flexibility of the placement of the seats 38 in the vessel.

An important feature of the invention is the notched transom/stern configuration, as is specifically shown in FIGS. 1-4. As there shown, the transom plate 26 is positioned substantially forward of the outer stern wall sections 22 and 24. This permits a marine motor, such as the motor 42 shown in phantom in FIG. 4, to be clamped to the transom plate 26 with the rearmost portion of the motor in advance of the upper edge 34 and gunwale 36 of the stern wall sections 22 and 24, assuring that the motor is in a noninterfering relationship with the stern.

Figure 7:
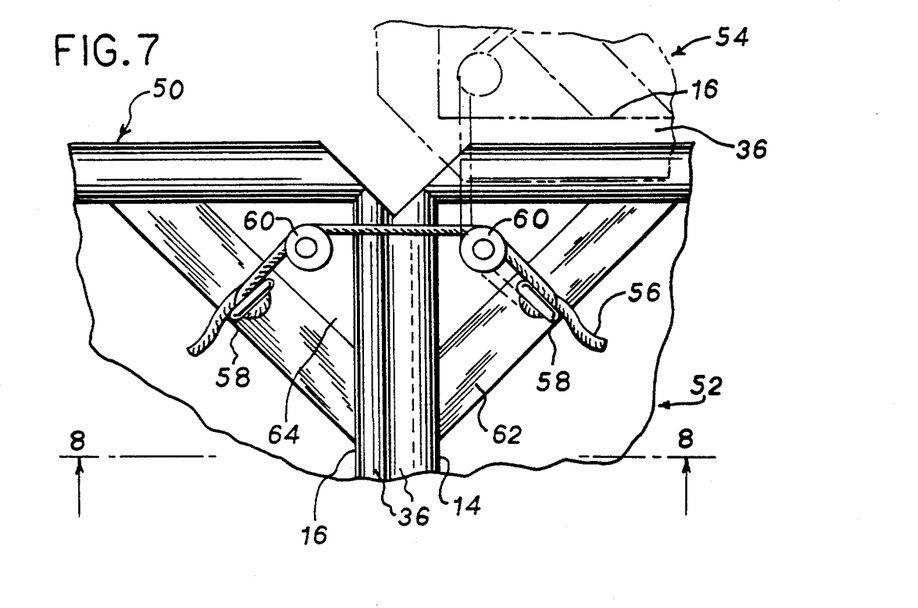
FIG. 7 is an enlarged view illustrating the interlocking relationship between gunwales of the vessels of the subject invention.

The gunwale 36 extends around the common upper edge 34 of the side, stern and bow walls and is adapted to be engaged in interlocking relationship with a like gunwale on another vessel, permitting an extension of the work platform for various types of rescue operations. As shown in FIG. 7, a plurality of vessels 50, 52 and 54 may be secured to one another to define an enlarged working platform by placing the gunwales 36 of each vessel in overlapping interlocking engagement with one another. In the preferred embodiment, once the gunwales are in proper engagement a tether line 56 is secured to the cleat 58 provided at the corner of each vessel and the post 60 which is mounted in longitudinal alignment with the cleat 58. The line 56 is then tightly secured to each cleat 58 and pulled across the post 50 for securing the vessels in interlocking engagement with one another.

The cleat may be mounted on an angle brace 62 (see FIG. 8) to provide an angled wedge-like engagement for assuring that the tether line does not become prematurely loosened from the cleat during use. The posts are each mounted on a corner angle brace 64 which, in the preferred embodiment, is an integral part of the cleat support 62. Of course, other methods not requiring a tether line may be used to hold the vessels in position.

Figures 8, 9:
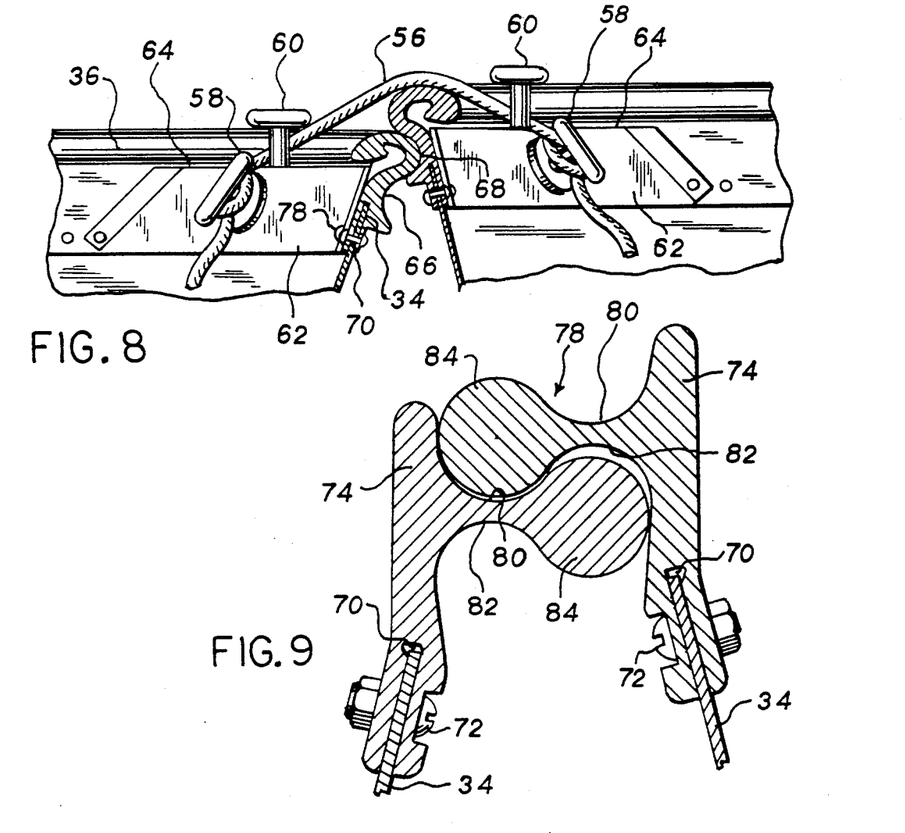
FIG. 8 is a section view taken generally along the line 8—8 of FIG. 7.
FIG. 9 is a view looking in the same direction as FIG. 8, showing an alternative embodiment of the gunwale.
Figure 10:
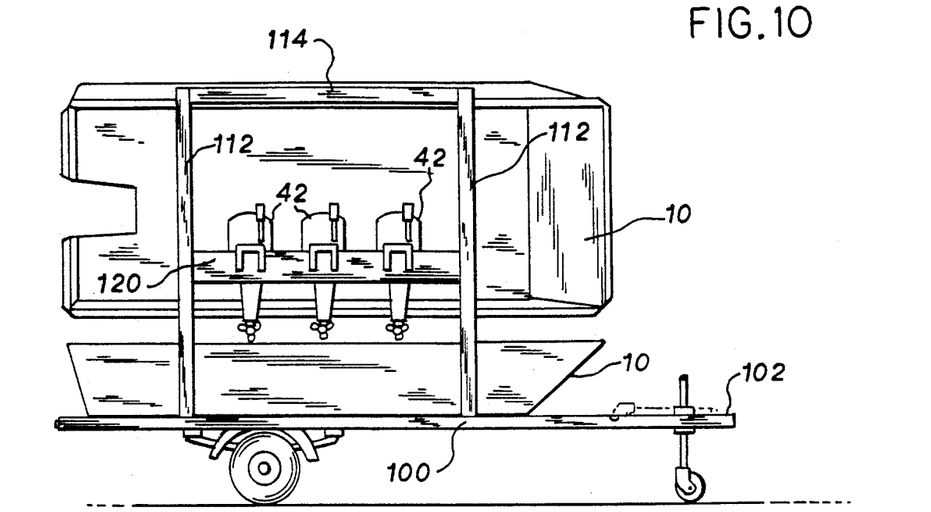
FIG. 10 is a side plan view of a first embodiment of a towing trailer for the vessels of the subject invention.
Figure 11:
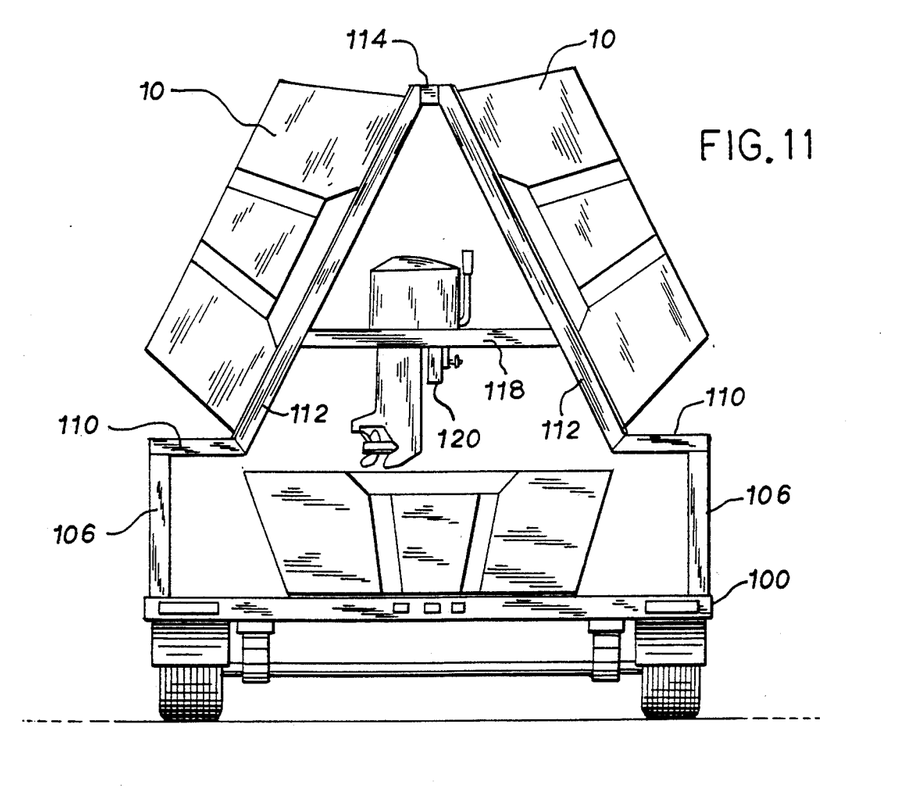
FIG. 11 is a rear plan view of the trailer of FIG. 10.

As is better shown in FIG. 8, a first embodiment of the gunwale 36 comprises a C-shaped lower channel 66 and an outwardly extending rounded locking member 68 which is adapted to be received in the channel 66, when adjacent vessels are positioned in interlocking engagement. The lower end of the gunwale 36 includes a slot 70 adapted for receiving the upper end edge 34 of the walls of the vessel. In the preferred embodiment, a fastener such as a rivet or a threaded screw and nut 72 is passed through the outer walls of the gunwale slot member and through the upper end 34 of the vessel walls for securing the gunwale tightly to the vessel. The gunwale may be made of a single continuous extrusion and, in a preferred embodiment, is made is a rigid material such as aluminum or the like.

An alternative embodiment of the gunwale is shown in FIG. 9, and includes a double inner lock channel system wherein each gunwale includes an upstanding inner wall 74 having a channel member 78 projecting outwardly therefrom and defining an upwardly and downwardly facing pair of complementary C-shaped channels 80 and 82. A rounded outer rail 84 is adapted to be received in one of the channels 80 and 82, as is particularly shown in FIG. 9. This provides dual channel interlocking engagement for the vessels in engagement with one another. The slot assembly mechanism for mounting the gunwale rail of FIG. 9 to the top edge 34 of each vessel is the same as that shown in FIGS. 7 and 8. It is also contemplated that the tether post and cleat mechanisms would be utilized for securing the gunwales in interlocking relationship with one another, as shown in FIGS. 7 and 8. The gunwale configuration of FIG. 9 may also be made of a single extruded unitary piece in the preferred embodiment, and is made of a rigid structural material such as aluminum or the like.

The gunwale system of the subject invention permits a plurality of vessels to be positioned in interlocking engagement with one another in any of a variety of combinations, such as those shown, by way of example, in FIGS. 5 and 6. As shown in FIG. 5, the vessels may be secured in a U-shaped configuration by securing the gunwale of sidewall 14 to the stern wall sections 22 and 24 of an adjacent vessel. The marine engine for the vessel 81 is mounted on the transom plate 26 and is contained entirely within the notch 27, and in noninterfering relationship with the sidewall 14 of the vessel 80. Vessel 81 is interconnected with vessel 82 in a bow-to-bow configuration. Vessels 84 and 58 are similarly connected to complete the U-shaped platform.

As shown in FIG. 6, the vessels 80-85 have been maneuvered to form a modified configuration with the vessels 80 and 81 secured with common sides in interlocking engagement with one another and the remaining vessels secured in either a side-to-side or stern-to-side configuration. It will be readily understood that any variety of combinations of interlocking engagement may be utilized to construct a work platform in a desired shape and configuration.

It is an important aspect of the invention that the vessels may be stored in such a manner that they may be quickly deployed in order to expedite the initiation of rescue operations. A plurality of trailer configurations are shown in FIGS. 10-14 and are adapted for both stowing and transporting the vessels during rescue operations. The trailer configurations shown in FIGS. 10-14 are illustrative of trailers used for the vessels and should not be considered to be exhaustive. As is particularly shown in FIGS. 10 and 11, the first embodiment of the trailer includes a wheeled frame or base 100 having a tongue or tow bar 102 extending outwardly therefrom by which the trailer may be attached to a tow vehicle. The first vessel 10 is adapted to be placed directly on the base 100 of the trailer. In the embodiment shown, the cross section of the trailer is substantially triangular in shape (see FIG. 11). As there shown, the lower end of the triangle is expanded and is defined by two outer upstanding legs 104 and 106 each with a horizontal structural member 110 extending inwardly therefrom and terminating at the base of the outer triangle sides 112. The upper end of the triangle terminates in an elongated top support 114 which runs the length of the trailer (see FIG. 10). In the preferred embodiment, the front frame of the triangle is identical to the rear frame shown in FIG. 11. The horizontal rails or sections 110 each support a vessel 10 which may be leaned against the side rails 112 of the triangle, as shown. In the preferred embodiment, a cross support member 118 is provided in each frame of the triangle and supports an elongated rail 120 adapted for receiving a plurality of marine engines 42 which may be clamped on the rail 120 by utilizing the transom mount clamp provided on the motor. The trailer configuration of FIG. 10 permits ready stowage and removal of the vessels 10 and motors 42 from the trailer during rescue operations.

Figure 12:
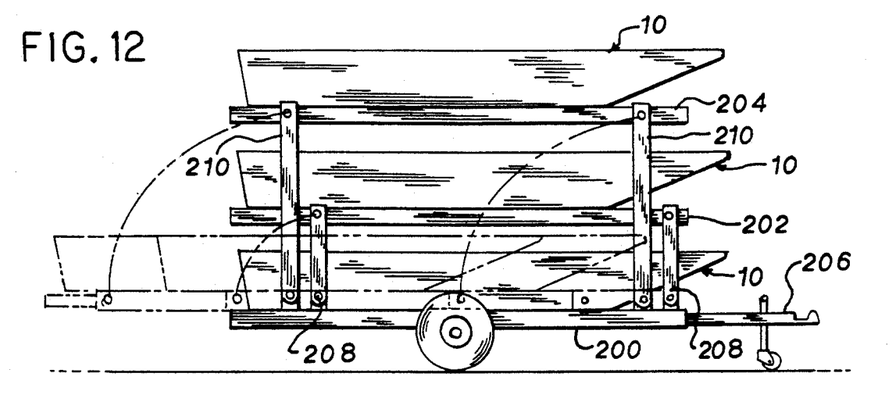
FIG. 12 is a view looking in the same direction as FIG. 10, showing an alternative embodiment of the trailer.
Figure 13:
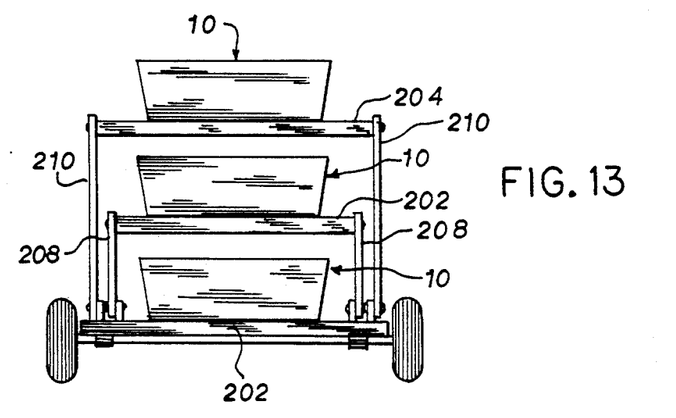
FIG. 13 is a view looking in the same direction as FIG. 11, showing the trailer of FIG. 12.

An alternative embodiment of the trailer mechanism is shown in FIGS. 12 and 13, and comprises a plurality of parallel platforms 200, 202 and 204, each for supporting a vessel 10, substantially as shown. As in the first embodiment, the lower platform 200 is the base or framework of a wheeled trailer and includes a tongue or tow bar 206 extending outwardly therefrom for securing the trailer to a tow vehicle. The first raised platform 202 is mounted on a plurality of legs 208 which are pivotally secured to the frame 200 and the platform 202, as is more clearly shown in FIG. 13. The permits the platform 202 to be pivoted downwardly where it will rest on platform 200 after the lower vessel 10 has been removed. A second raised platform 204 is also supported by pivotal legs 210 which are disposed outwardly of the legs 208 (see FIG. 13). The platform 204 may also be pivoted downwardly and rested against the platform 202 after the vessels have been removed from platforms 200 and 202, gaining ready access to the uppermost vessel 10. In the configuration of FIGS. 12 and 13, the marine motors may be stowed on the deck of the vessel.

Figure 14:
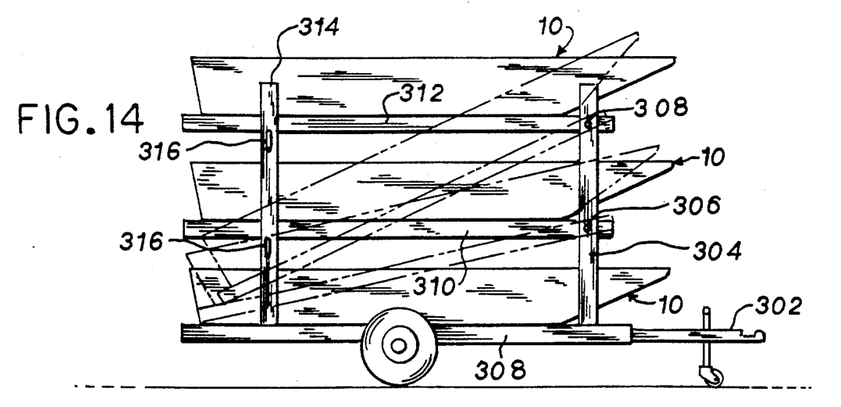
FIG. 14 is a view similar to FIG. 13, showing an additional embodiment of the trailer for stowing and towing the vessels of the subject invention.

An additional embodiment of the trailer is shown in FIG. 14, and also includes a wheeled frame 300 defining a platform for supporting a vessel 10. As in the previous embodiments, the frame 300 includes a tongue or tow bar 302 for attaching the trailer to a tow vehicle. In the embodiment of FIG. 14, the front upstanding leg 304 of the support frame includes two pivot points 306 and 308 for supporting a pair of raised platforms 310 and 312. The raised platforms 310 and 312 are each adapted for supporting one of the vessels 10. The rear support leg 314 of the trailer includes two cross members 316 each adapted for supporting the underside of the raised platforms 310 and 312. It will, of course, be understood that the opposite side of the frame is identically constructed. The base 310 is pivotable about the pivot 306, as shown in phantom in FIG. 14, when the cross member supporting it is removed from the leg 314. This defines a ramp by which the vessel supported thereon may be advanced onto and removed from the platform 310. The platform 312 is similarly pivotable about point 308 when the associated cross piece 316 is removed therefrom, for gaining access to the uppermost stowed vessel 10. Again, as with the embodiment of FIGS. 12 and 13, it is contemplated that the marine motors associated with each of the vessels 10 would be stowed on the vessel deck.

The vessel, gunwale and trailer configurations of the subject invention provide a versatile, expedient work and rescue vessel system adapted for surface work and rescue operations in a wide variety of applications. Certain features and embodiments of the invention have been described in detail herein and it will be readily understood that the invention encompasses all modifications and enhancements within the scope and spirit of the following claims.

What is claimed is:

1. A vessel for surface operation wherein a plurality of like vessels may be secured to one another for forming an enlarged working platform, the vessel comprising:
    a. a floating platform having a generally rectangular outer perimeter;
    b. upstanding rim extending substantially about the perimeter for defining side walls having a common upwardly projecting edge; and
    c. a gunwale secured to and extending substantially about the rim, the gunwale having an interlocking support surface, a guide member, a locking member, and a locking channel adapted for engaging and interlocking with a like gunwale on a second vessel, whereby the vessels may be interlocked with one another along any of the sides thereof.

2. The vessel of claim 1, wherein said rim is defined by the top edge of upstanding side walls extending substantially about the perimeter, and said gunwale is attached to and extends about the top edge.

3. The vessel of claim 1, further including a plurality of seats spanning the floating platform.

4. The vessel of claim 3, further including at least one seat spanning the side walls and supported by the floating platform.

5. The vessel of claim 4, including support members mounted on the sidewalls for selectively securing the seat thereto for maintaining it in position on the platform.

6. The vessel of claim 5, wherein the seat includes an internal abutment surface and the support members include stop surfaces on the side walls adapted for engaging the internal abutment surface.

7. The vessel of claim 6, wherein the seat comprises a unitary member having a substantially inverted U-shaped cross-section and wherein the stop members comprises projecting shoulders adapted to be received inside the open end of the U for engaging and securing the seat in position.

8. The vessel of claim 5, further including a plurality of support members whereby the seat may be secured in any of a plurality of positions.

9. The vessel of claim 2, wherein the floating platform is the bottom of a boat hull and wherein the side walls form the sides of the hull.

10. The vessel of claim 9, wherein the bottom is substantially flat.

11. The vessel of claim 2, wherein one of the sidewalls includes a transom for supporting a marine motor.

12. The vessel of claim 11, wherein the transom is located inside the rectangular perimeter of the vessel.

13. The vessel of claim 2, wherein the side walls define substantially straight vessel sides running parallel to the longitudinal axis of the boat and a substantially straight bow and substantially straight stern each running orthogonal to the longitudinal axis of the vessel.

14. The vessel of claim 13, wherein the interlocking gunwale extends along at least a portion of both sides, the bow and the stern of the vessel such that a plurality of similar vessels may be secured to one another in any of the following combinations: side-to-side, stern-to-stern, bow-to-bow, side-to-bow, side-to-stern, and bow-to-stern.

15. The vessel of claim 1, wherein the gunwale further comprises
    a support adapted for securing the gunwale to the vessel,
    wherein the guide member projects from the support, the guide member having an inner end attached to the support and an outer end spaced outwardly from the support for defining the locking channel therebetween, and
    wherein the locking member is secured to the outer end of the guide member and is adapted to be received in the locking channel of a similar gunwale of another vessel.

16. The vessel of claim 15, wherein the rim includes an upper edge of a substantially rectangular cross-section, and wherein the support includes a mounting channel adapted for receiving the upper edge of the rim for positioning the gunwale thereon.

17. The vessel of claim 16, further including fasteners for securing the gunwale to the rim at the mounting channel.

18. The vessel of claim 17, wherein said fasteners each further include:
    a. an elongated shaft passing through the gunwale support and mounting channel and through the upper edge of the rim in said mounting channel; and
    b. means for securing the shaft in place.

19. The vessel of claim 15, wherein the gunwale guide member is disposed generally laterally of the upper edge of the rim.

20. The vessel of claim 15, wherein the gunwale guide member is disposed generally above the upper edge of the rim.

21. The vessel of claim 15, wherein the gunwale further comprises a unitary member configured to define the support, locking channel, guide member and locking member.

22. The vessel of claim 21, wherein the guide member is a substantially C-shaped member disposed above the support and the locking member is a substantially reversed C-shaped member above the guide member and adapted to the received in a complementary guide member of another vessel when the gunwales are placed in interlocking engagement.

23. The vessel of claim 21, wherein the guide member is an upper and lower concave channel disposed outwardly form the support and wherein the locking member is a rounded member of an arc adapted to fit in the concave channel, wherein the rounded locking member of the gunwale of one vessel is received in the upper concave channel of a second vessel and the rounded locking member of the second vessel is received in the lower concave channel of said one vessel when the gunwales are in interlocking engagement.

24. The vessel of claim 1, further including detachable securing means for securing the interlocked vessels to one another.

25. The vessel of claim 24, wherein the detachable securing mean comprises a cleat, a mated tensioning post and a detachable tether line, whereby the tether line may be secured to complementary cleats and tightly tensioned about complementary posts of adjacent interlocking vessels.

26. The vessel of claim 11, wherein said one side wall defines the stern of the boat and includes a notch on the longitudinal axis positioned inwardly of the stern for supporting and housing an outboard engine such that the outboard engine is in a noninterfering relationship with the interlocking gunwales of the vessel.

27. A vessel for surface rescue operations wherein a plurality of like vessels may be secured to one another for forming an enlarged working platform, the vessel having a generally rectangular outer perimeter and upstanding side walls about the perimeter, the side walls including a common upper rim extending substantially about the perimeter for defining an outer upwardly projecting edge, the vessel further including a gunwale secured to and extending substantially about the rim, the gunwale including an interlocking support surface adapted for engaging and interlocking with a like gunwale on another vessel, whereby the vessels may be interlocked with one another, the gunwale comprising:
  a. a support adapted for securing the gunwale to the vessel;
  b. a guide member projecting from the support, the guide member having an inner end attached to the support and an outer end spaced outwardly from the support for defining a locking channel therebetween; and
  c. a locking member secured to the outer end of the guide member and adapted to be received in the locking channel of like gunwale of another vessel along any side wall of the perimeter thereof.

28. The vessel of claim 27, wherein the guide member is a substantially C-shaped disposed above the support and the locking member is a substantially reversed C-shaped member above the guide member and adapted to the received in a complementary guide member of another vessel when the gunwales are placed in interlocking engagement.

29. The vessel of claim 27, wherein the guide member is an upper and lower concave channel disposed outwardly from the support and wherein the locking member is a rounded member of an arc adapted to fit in the concave channel, wherein the rounded locking member of the gunwale of one vessel is received in the upper guide channel of a second vessel and the rounded locking member of the second vessel is received in the lower guide channel of said one vessel when the gunwales are placed in interlocking engagement.

30. The vessel of claim 27 wherein the gunwale further comprises a unitary member configured to define the support, locking channel, guide channel and locking member.

31. The vessel of claim 27, further including at least one seat spanning the side walls and supported by the floating platform, and support members mounted on the sidewalls for selectively securing the seat thereto for maintaining it in position on the platform.

32. The vessel of claim 31, wherein the seat comprises a unitary member having a substantially inverted U-shaped cross-section and wherein the support members comprise projecting shoulders adapted to be received inside the open end of the U for engaging and securing the seat in position.

33. The vessel of claim 27, wherein said one side wall defines the stern of the boat and includes a notch on the longitudinal axis positioned inwardly of the stern for supporting and housing an outboard engine such that the outboard engine is in a noninterfering relationship with the interlocking gunwales of the vessel.

34. The vessel of claim 27, further including detachable securing means for securing the interlocked vessels to one another, comprising a cleat, a mated tensioning post and a detachable tether line, whereby the tether line may be secured to complementary cleats and tightly tensioned about complementary posts of adjacent interlocking vessels.

* * * * *